Sept. 11, 1934.  R. B. LEWIS  1,973,640
GAUGE
Filed Nov. 14, 1928
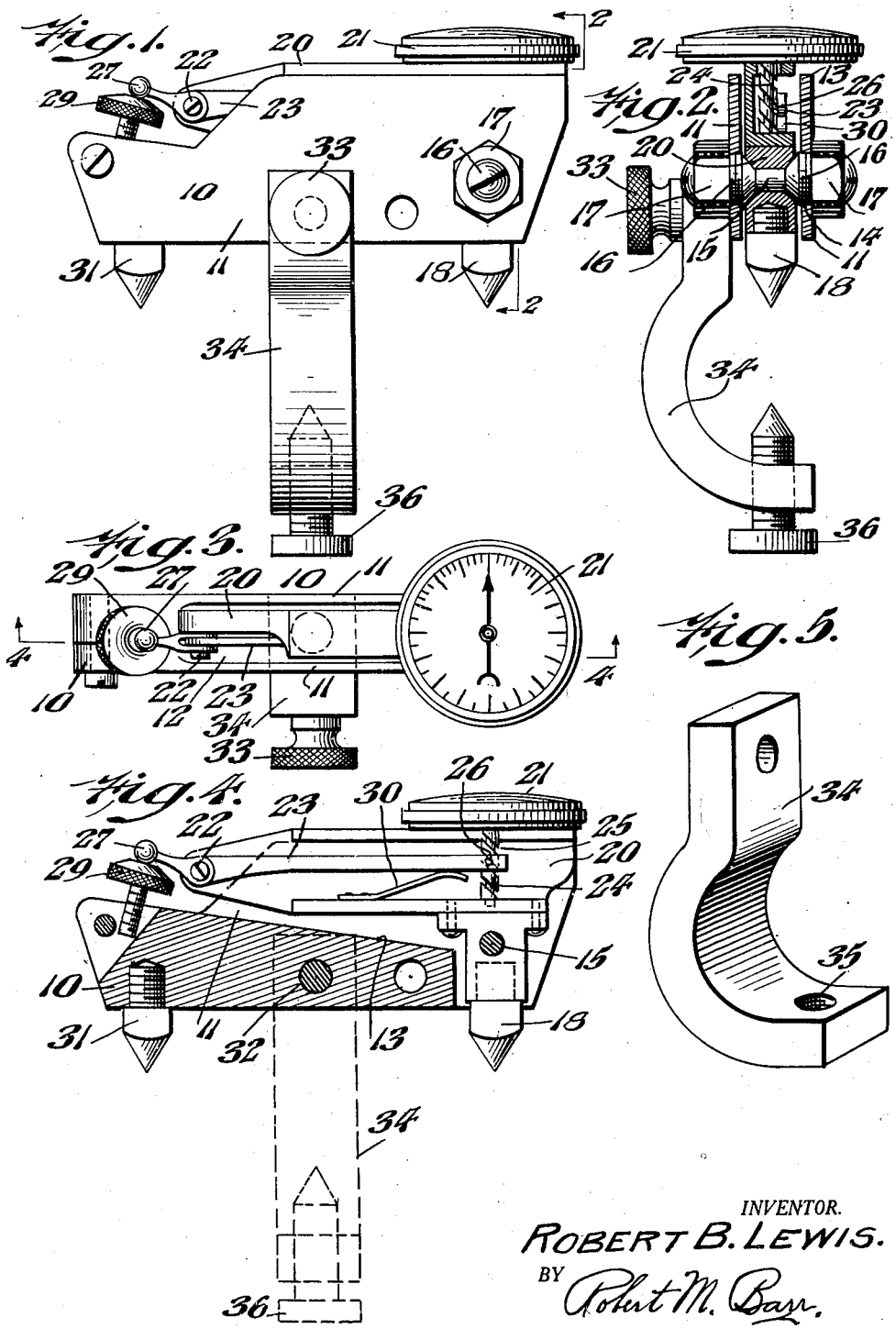
INVENTOR.
ROBERT B. LEWIS.
BY Robert M. Barr,
ATTORNEY.

Patented Sept. 11, 1934

1,973,640

UNITED STATES PATENT OFFICE 1,973,640

GAUGE

Robert B. Lewis, Philadelphia, Pa., assignor to Tinius Olsen Testing Machine Company, Philadelphia, Pa., a corporation of Pennsylvania Application November 14, 1928, Serial No. 319,308

4 Claims. (Cl. 33—148)

The present invention relates to gauges and more particularly to an indicating gauge for determinating the stresses in various materials under varying conditions.

Some of the objects of the present invention are to provide an improved gauge for measuring strain in a member; to provide a gauge which is more accurate than any heretofore devised for measuring stretch of materials under tension; to provide a gauge of the extensometer type wherein moving parts are so associated and arranged that movement of the body being measured at the time of measurement cannot introduce an error in the reading of the instrument; to provide an improved automatic, direct reading strain gauge; to provide a gauge wherein long levers and sliding parts heretofore deemed necessary have been dispensed with; to provide a relatively small, compact and accurate reading strain gauge; to provide a strain gauge wherein inertia due to moving parts is lessened; and to provide other improvements as will hereinafter appear.

The purpose of the instrument of the present invention is to measure the relative movement or change in length between two points. When this movement is desired in a structure which is in motion, the line of direction through these two points is in the majority of cases in the line of motion. Should the lever or instrument measuring the relative motion between these two points be out of balance with reference to its pivot or oscillating point, the end possessing this unbalance would indicate faster or slower the relative movement of the two points depending on lengthening or shortening of distance between the two points as a whole. In other words, the two points being measured can be assumed to be located on some body which possesses a movement as a body, and this movement will influence the response of the measuring device to the relative movement of the one point to the other which takes place when the specimen or body distorts due to the load it is carrying. To reduce this distorting effect a crank-shaped lever has been devised which is so proportioned that the mass is substantially balanced about the point of support or pivot, therefore the motions of the body on which the instrument is mounted will have a lessened effect in producing an initial rotation in this member which in turn would distort the indication as above set forth.

Another way of expressing this is that a lever has been built into a strain gauge which has a substantially static balance with reference to the pivot about which it swings as compared to the direction of motion of the body, and placing this instrument on the part desired to be measured so that the static balance of this lever is as near perfect as it is expedient to make it and thus tend to eliminate errors in measurements and thus producing an apparatus which will indicate more accurately the strain in machine members when in motion. It is this action that is described hereinafter as "inertia effect."

In the accompanying drawing, Fig. 1 represents a side elevation of a strain gauge embodying one form of the present invention; Fig. 2 represents a section on line 2—2 of Fig. 1; Fig. 3 represents a plan of the gauge; Fig. 4 represents a section on line 4—4 of Fig. 3; and Fig. 5 represents a perspective of one form of gauge clamp.

Referring to the drawing, one form of the present invention consists of a frame 10 provided with upwardly extending parallel side flanges 11 forming a longitudinally disposed slot 12 having an inclined bottom 13 which terminates short of one end of the frame to leave the flanges 11 projecting as a bifurcation or fork. This bifurcated portion of the flanges 11 is apertured, as shown at 14, to mount a short shaft 15 which is held in place by bearing bushings 16 at opposite sides threaded into the flanges 11 and rigidly held by nuts 17. This shaft 15 serves as a pivotal mounting for one of the gauge points 18, the base portion of which is attached by suitable fastening devices to an arm 20 so that the latter swings with the point and relative to the flanges 11. One end of the arm 20 carries an indicating dial 21 from which readings are taken during a testing operation. The other end of the arm 20 is provided with a pivot 22 for an operating lever 23, the long arm of which extends lengthwise of and parallel to the arm 20 and terminates in close proximity to the pointer spindle 24 of the dial and in order that rocking movement of the lever 23 can be translated into a movement of the dial pointer the spindle 24 is provided with a spiral groove 25 which seats a pin 26 projecting from the side of the lever 23. The short arm of the lever 23 terminates in a ball or other contact piece 27 arranged to rest upon and be held in contact with an adjusting screw 29 by means of a strip spring 30 which is tensioned between the frame 10 and the long arm of the lever 23. By rotating the screw 29 to bring it into contact with the ball piece 27 it is possible to adjust the dial pointer to zero position when setting the instrument.

For the purpose of measuring the movement of a test piece under strain, the frame 10 is provided with a second gauge point 31 which projects from the frame in the same direction as does the gauge point 18 and is preferably spaced therefrom to lie in the same plane, this plane as here shown being the medial plane of the frame 10. Also the length of the gauge point 31 is the same as that of the gauge point 18 and consequently when the instrument is placed upon a test piece both of the points will engage the test piece with the axis of the instrument parallel with the element being measured. Any elongation of the test piece will be transmitted to the two gauge points and since one is movable with respect to the other there will be a relative movement of the points corresponding to the length and movement of the measured length of test piece under strain. This lengthening of the test piece will cause the gauge point 18 and the dial carrying arm 20 to swing about the shaft 15 as a pivot to thereby shift the fulcrum of the lever 23 and cause the long arm of the lever 23 to move counter-clockwise, as shown in Fig. 1, so that motion is transmitted to the dial spindle 24. This spindle movement will result in the pointer of the dial moving to a position which accurately indicates the amount of variation in the length of the element being measured. In connection with the arm 20 and its attached gauge point 18 it should be noted that these parts when assembled and mounted upon the pivot 15 form in effect a bell-crank lever of which the arm 20 is the long arm and this latter lies substantially parallel to the axis of a test piece when in position and likewise parallel to a line joining the two guauge points 18 and 31. This construction brings the center of gravity of the parts 18, 20, and 21 in close proximity to the pivot 15 and consequently the inertia of the parts due to motion of the entire body parallel to a line connecting the gauge points 20 and 18 will be reduced to a minimum. In other words the parts 18, 20 and 21 are substantially in balance when the instrument as a whole moves in the aforesaid direction parallel to the line connecting the points 18 and 31.

In order to support the gauge on a test piece, the frame 10 is provided with a threaded opening 32 extending transversely of the frame to receive a clamp screw 33 which passes through one end of a clamp arm 34 and secures it to the side of the frame 10. The opposite end of the clamp arm is offset laterally and is provided with a threaded opening 35, in the plane of the axis of the test piece, to receive a center screw 36 which exerts a thrust in the direction of the gauge points 18 and 31 which are on the opposite side of the test piece. Thus with the frame 10 supported in position upon the test piece, by means of the clamping device 34, any elongation of the test piece will cause the dial arm point to move correspondingly with resepct to the other point and this relative movement is a measure of the stretch or distortion of the test piece and is indicated on the dial in accurate terms.

An important feature of the present invention resides in providing a gauge construction wherein the effects of inertia due to movement of the gauge with the piece under test in a direction parallel to the line connecting the two gauge points 18 and 31 are substantially nullified. As gauges of this type are quite generally used to measure change in length of a piece while in motion it is quite evident that a false reading is inevitable unless this error of inertia can be compensated in such a manner as not to appear in the dial reading. The instrument of the present invention has to a considerable extent solved this problem, which all others have failed to do, by mounting the lever system upon the pivot 15, and so locating the pivot with respect to its center of mass that when the instrument is moved bodily parallel to the line connecting the two gauge points there can be no substantially relative movement of the arm 20 due to inertia. In order words, the arm 20 is substantially statically in balance when the instrument moves in the aforesaid direction.

It will now be apparent that a complete unitary gauge has been devised for accurately indicating the stretch of a test piece under load and wherein the number of parts has been reduced to a minimum. Furthermore, by mounting the indicating dial directly upon a part movable with respect to the frame and using that part as a measure of gauge point variation, it has been possible to overcome to a considerable extent the factors of inaccuracy of prior gauges of this character because the present invention tends to compensate for errors normally caused by movement of the structure to which the gauge is attached. Thus should a structure which is being measured for change in length move in the direction of its length this same movement will carry the gauge body which is attached to the structure for measuring the length of changes and consequently bring in a disturbing inertia factor to the indicating mechanism. In prior apparatus this inertia introduces an error in the reading and the indication of the change of length is untrue and inaccurate. By the construction here devised, however, this force due to inertia of the measuring points is substantially balanced about a common pivot and no substantially distortion of the measuring or multiplying arm can occur. Thus sudden shocks or movements imparted to the present lever system by the movement of the structure or bar being measured will have a lessened distorting effect on the record of length. While the foregoing description has been confined to a well-known type of dial indicator, it is to be understood that the invention is not confined to this particular type of indicator as other types of indicating indicators can be used with the instrument without departing from the invention.

Having thus described my invention, I claim:

1. In a strain gauge, an elongated frame, a gauge point secured to said frame for engaging a piece to be tested, a pivot secured to said frame, an arm mounted on said pivot close to its center of gravity and disposed in close proximity to said frame and substantially parallel with the direction of motion of the piece being tested, a second gauge point secured to said arm and located on a line normal to said piece and passing through said pivot, an indicating instrument carried by said arm, and means carried by said arm and coacting with said frame for operating said indicating instrument whereby the effects of inertia are automatically reduced to a minimum.

2. In a strain gauge, an elongated frame, a gauge point secured to said frame for engaging a piece to be tested, a pivot secured to said frame, an arm mounted on said pivot close to its center of gravity and disposed in close proximity to said frame and substantially parallel with the direction of motion of the piece being tested, a second gauge point secured to said arm and located on a line normal to said piece and passing through said pivot, an indicating instrument carried by said arm and coaxially disposed with respect to a straight line passing through said pivot and said second gauge point, and means carried by said arm and coacting with said frame for operating said indicating instrument whereby the effects of inertia are automatically reduced to a minimum.

3. In a strain gauge, an elongated frame having a slot therein extending longitudinally thereof, a gauge point secured to said frame for engaging a piece to be tested, a pivot extending transversely of said slot, an arm mounted on said pivot close to its center of gravity and extending lengthwise of said slot substantially parallel with the direction of motion of the piece being tested, a second gauge point secured to said arm and located on a line normal to said piece and passing through said pivot, an indicating instrument carried by said arm, and means carried by said arm and coacting with said frame for operating said indicating instrument, whereby the effects of inertia are automatically reduced to a minimum.

4. In a strain gauge, an elongated frame having a slot therein extending longitudinally thereof, a gauge point secured to said frame for engaging a piece to be tested, a pivot extending transversely of said slot, a bell crank mounted on said pivot close to its center of gravity and extending lengthwise of said slot with its long arm substantially parallel with the direction of motion of the piece being tested, a second gauge point secured to the short arm of said bell crank and located on a line normal to said piece and passing through said pivot, an indicating instrument carried by said bell crank, and means carried by said long arm and coacting with said frame for operating said indicating instrument.

ROBERT B. LEWIS.